UNITED STATES PATENT OFFICE.

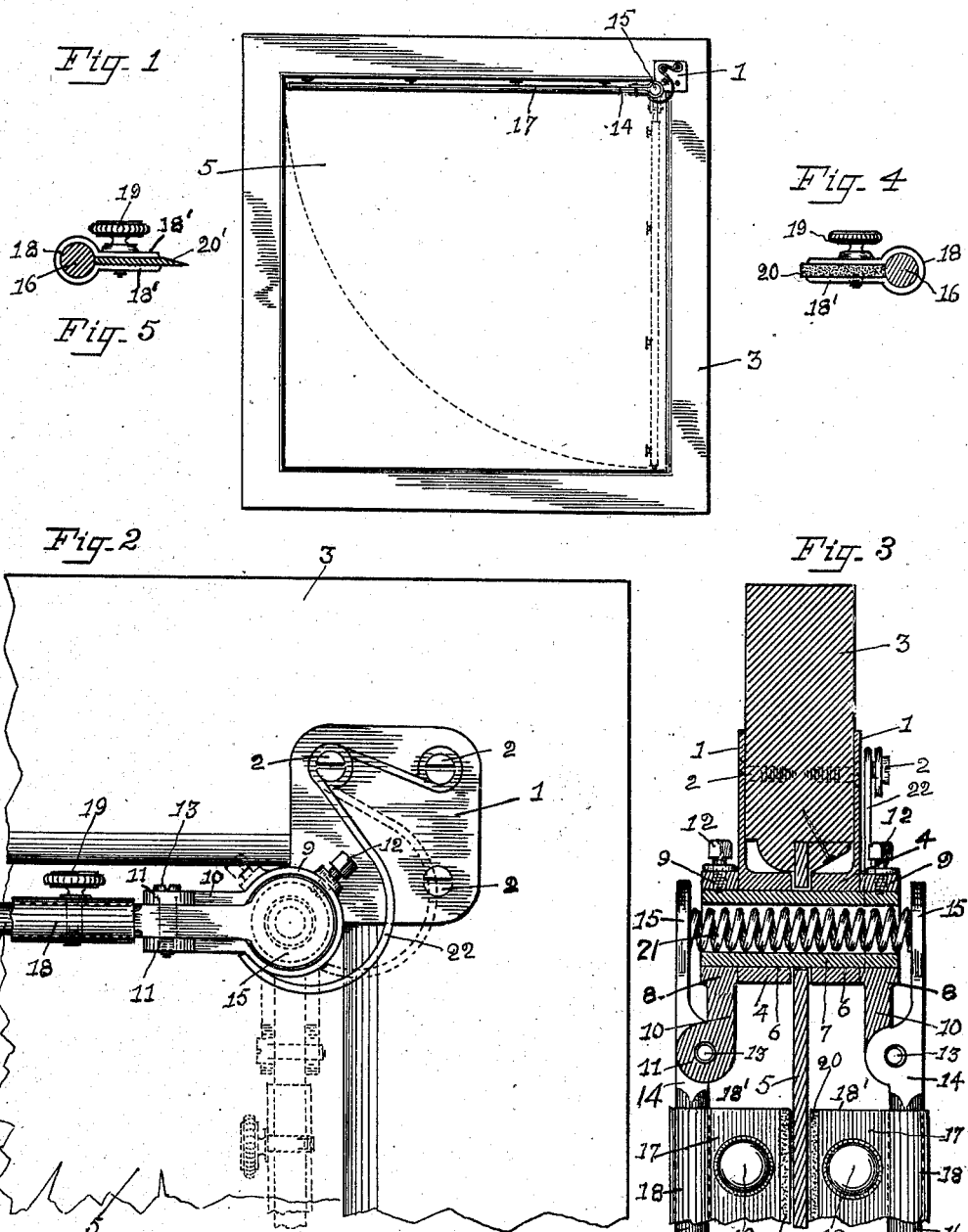

WILLIAM H. MINIER, OF TOLEDO, OHIO.

WINDOW-CLEANER.

No. 924,685.          Specification of Letters Patent.          Patented June 15, 1909.

Application filed February 23, 1909.   Serial No. 479,346.

*To all whom it may concern:*

Be it known that I, WILLIAM H. MINIER, a citizen of the United States, residing at Toledo, in the county of Lucas and State of Ohio, have invented a new and useful Improvement in Window-Cleaners, of which the following is a specification.

My invention relates to a cleaner for windows, and has for its object to provide a device of the kind that is adapted to be attached to the outlook windows of electric cars or locomotive cabs, and whereby the motorman or engineer may readily and conveniently clean both sides of the window glass at the same time, and keep it clear and free of rain, snow, frost, sleet, or moisture. I accomplish these objects by the construction, arrangement and combination of parts, as hereinafter described and illustrated in the drawings, in which—

Figure 1 is a side elevation of a window sash, with my cleaner attached. Fig. 2 is an inside view of an enlarged broken away corner of the same. Fig. 3 is a view partly in cross section of Fig. 2, showing the sash, and the parts of the cleaner that are directly attached thereto, sectioned in a plane coinciding with the axis of the pivot and bearings of the wiper arms, excepting the left wiper arm support, which is sectioned in a plane parallel with said axial plane, and showing unsectioned, broken away portions of the wiper arms extended from their supports, with their longitudinal centers in said axial plane. Fig. 4 is a cross section of a wiper arm showing the wiper holder provided with a rubber wiper strip, and Fig. 5 is a similar view showing a metal blade substituted for the rubber strip.

In the drawings 1, 1 are plates which are oppositely secured, by the screws 2, to opposite sides of the window sash 3, between the outer and inner angles of a corner of the sash. Each plate 1 has an integral cylindrical extension 4 projecting over the corner portion of the glass 5 of the sash, the outer end of the cylindrical extension being flush with the outer face of the plate, and the inner end being in engagement with the face of the glass. The extensions 4 are provided with alined bores 6 which register with a bore of the same diameter in the glass 5, and in the bores 6 are journaled a tubular arbor 7 which has end portions that project beyond the ends of the extension and have mounted thereon arm supports 8, each comprising an annular disk or collar 9 adapted to closely fit around the end portions of the arbor and having an integral bifurcated arm support 10 extending parallel with the faces of the glass, and provided with hinge ears 11 perforated in alinement. The collar portions 9 are provided with set screws 12 by which they are secured against turning on the arbor 7.

Between the ears 11 of both the outer and inner arm supports and hinged thereto by the pin 13 are the wiper arms 14, which are provided with short arm portions having disk shaped end terminals, 15 that are extended opposite the bore of the tubular arbor 7, and long arm rod portions 16 of a length to extend across the glass 5 to the opposite side of the sash frame.

The arm supports 8 are mounted on the arbor 7 in position to hold the arms 14 extended parallel on opposite sides of the glass 5, and on each arm is mounted a wiper holder 17 formed of a strip of sheet metal of suitable width and length, by bending its longitudinal central portion into an open tube 18 of a diameter to closely receive the rod portion 16 of the wiper arm 14, and parallel holder portions 18′, of the margins of the strip.

The holder portions 18′ are provided with alined perforations at regular intervals in which are mounted the clamping thumb screws 19, and between the holders are inserted the wiper strips 20, preferably formed of rubber, which are provided with elongated transverse holes, adapted to register with the perforations of the holder. When the strips are mounted between the holder portions 18′ and the screws 19 are run in, the holder is clamped on the arm 16 against turning thereon and the strips are secured in the holder. In the bore of the arbor 7 is inserted a helical spring 21 of a greater length than the arbor, and the spring is compressed between the terminals 15 of the wiper arms 14, whereby the wiper strips are normally held compressed oppositely against the glass 5. Upon the screws of the inner plate 1 there is preferably mounted a spring 22, which engages the under side of the collar 9 of the inner arm support 8, and normally holds the wiper arms 14 extended horizontally along and beneath the upper member of the sash frame 3. Thus constructed and attached to the sash, the motorman may from time to time, as required by the condition of the glass, simultaneously operate both wiper arms by moving the inner wiper arm back and forth over the face of the glass a quarter turn around its central pivot, and the arms 14 being of a length equal to the width of the glass, the greater portion of the glass will be thereby made clean and clear.

If the outer face of the glass requires cleaning more than the inner, increased pressure may be given the wiper of the outer arm on the glass by pulling inward on the inner arm as it is moved back and forth, and if increased pressure is required on the inner face of the glass such pressure may be given by outward pressure on the inner arm 14 as it is moved back and forth. When the inner arm is released the spring 22 returns the wiper arms to their normal position across the upper part of the glass. I do not limit myself however to the use of the spring 22, as it is manifest that the arms are equally effective for use without it, and are equally as free from obstructing view through the glass in a pendent position along the side as at the top of the glass.

For removing frost from the glass a metal blade 20' as shown in Fig. 5 may be substituted for the rubber wiper strip 20 shown in Fig. 4. Before tightening the wiper holders on the wiper arm the holders are adjusted to any suitable angle to the surface of the glass.

It is manifest that by securing an additional device of the same construction, except with shorter wiper arms,—in the diagonally opposite lower corner of the sash the entire inner and outer surfaces of the glass may be cleaned, but for the purpose of maintaining the greater portion of the glass in condition for a clear view of the track ahead in all kinds of weather, one is sufficient. It is manifest also that without any change in construction other than in the length of the wiper arms, two of the devices may be conveniently located, one central of each side of the sash instead of in the corner as shown. I therefore do not limit myself to any particular location for the attachment of my invention to a window sash.

What I claim to be new is—

1. In a window cleaner, in combination with a sash, and pane of glass mounted in the sash and provided with an orifice adjacent to the sash, a pair of plates secured opposite each other on the outer and inner sides of the sash, and having portions extending over the glass provided with bearings alined on opposite sides of the glass and registering with the orifice of the glass, a tubular arbor journaled in the bearings with the end portions of the arbor projecting beyond the plates, an arm support fixedly mounted on each projecting end portion of the arbor, a wiper arm hinged to each arm support and extending over the glass, a wiper secured to each arm and engaging the glass, and a spring engaging each arm and adapted to compress the wipers against the glass, substantially as set forth.

2. In a window cleaner, in combination with a sash, and a pane of glass mounted in the sash, and provided with an orifice adjacent to the sash, a pair of plates secured opposite each other on the outer and inner sides of the sash, and having portions extending over the glass and provided with bearings alined on opposite sides of the glass, a tubular arbor journaled in the bearings with the end portions of the arbor projecting beyond the plates, an arm support fixedly mounted on each projecting end portion of the arbor, a wiper arm hinged to each arm support, each wiper arm having a short arm portion extending opposite the adjacent end of the arbor, and a long arm portion extending oppositely to the short arm, over the glass, a wiper mounted and detachably secured on each long arm and engaging the glass, and a helical spring compressed in the bore of the arbor and engaging the short arms of the wiper arms.

3. In a window cleaner, in combination with a sash, and a pane of glass mounted in the sash, and provided with an orifice adjacent to the sash, a pair of plates secured opposite each other on the outer and inner sides of the sash, and having portions extending over the glass and provided with bearings alined on opposite sides of the glass, and registering with the orifice of the glass, a tubular arbor journaled in the bearings with the end portions of the arbor projecting beyond the plates, an arm support fixedly mounted on each projecting end portion of the arbor, a wiper arm hinged to each arm support, each wiper arm having a short arm portion extending opposite the adjacent end of the arbor, and a long arm portion extending oppositely to the short arm, over the glass, a wiper mounted and detachably secured on each long arm and engaging the glass, a helical spring compressed in the bore of the arbor and engaging the short arms of the wiper arms, and a spring adapted to yieldingly hold the outer and inner arms in a predetermined position relative to the sash.

In witness whereof I have hereunto set my hand this 19th day of February, 1909.

WILLIAM H. MINIER.

In presence of—
  M. F. GRIFFIN,
  M. S. SMITH.